(12) United States Patent
Simon

(10) Patent No.: US 11,755,175 B2
(45) Date of Patent: Sep. 12, 2023

(54) KEYBOARD NAVIGATION MENU

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 17/394,576

(22) Filed: Aug. 5, 2021

(65) Prior Publication Data
US 2021/0373719 A1 Dec. 2, 2021

Related U.S. Application Data

(63) Continuation of application No. 16/884,471, filed on May 27, 2020, now Pat. No. 11,112,944.

(51) Int. Cl.
*G06F 3/0482* (2013.01)
*G06F 3/0483* (2013.01)
(Continued)

(52) U.S. Cl.
CPC .......... *G06F 3/0482* (2013.01); *G06F 3/0483* (2013.01); *G06F 3/0489* (2013.01); *G06F 3/04895* (2013.01)

(58) Field of Classification Search
CPC .. G06F 3/0482; G06F 3/0483; G06F 3/04895; G06F 3/0238
See application file for complete search history.

(56) References Cited

U.S. PATENT DOCUMENTS 5,796,404 A * 8/1998 Gentner ................ G06F 3/0489
715/823
6,114,978 A 9/2000 Hoag
(Continued)

FOREIGN PATENT DOCUMENTS

CN 103425775 A 12/2013

OTHER PUBLICATIONS

Scheuer, John. Omni Slide Menu. Screenshots of Web article last updated on May 31, 2012. Retrieved from [http://www.dynamicdrive.com/dynamicindex1/omnislide/index.htm] on [Oct. 31, 2022]. 4 pages (Year: 2012).*

(Continued)

*Primary Examiner* — Amy M Levy
(74) *Attorney, Agent, or Firm* — Buckley, Maschoff & Talwalkar LLC

(57) ABSTRACT

Provided is a keyboard navigation menu which provides navigation within a software application using keyboard commands instead of mouse/cursor based inputs. The keyboard activation menu can improve upon traditional mouse-based menus which often include hidden tabs or require multiple mouse inputs. In one example, the method may include displaying, via a user interface, a keyboard navigation menu comprising a plurality of different keyboard inputs that when pressed navigate a view of the user interface to a plurality of pages of a software application, respectively, detecting a keyboard input from among the plurality of different keyboard inputs which corresponds to a second page from among the plurality of pages of the software application, and changing a view of the user interface from the first page to the second page of the software application that corresponds to the detected keyboard input.

17 Claims, 11 Drawing Sheets

(51) Int. Cl.
   *G06F 3/04895* (2022.01)
   *G06F 3/0489* (2022.01)

(56) References Cited

U.S. PATENT DOCUMENTS

| | | | |
|---|---|---|---|
| 6,724,399 B1 | 4/2004 | Katchour et al. | |
| 7,669,146 B2 | 2/2010 | Lauff | |
| 7,689,924 B1* | 3/2010 | Schneider | G06F 3/0489 |
| | | | 715/728 |
| 7,802,203 B2 | 9/2010 | Danninger | |
| 7,818,686 B2 | 10/2010 | Cooke | |
| 8,020,096 B2 | 9/2011 | Pagan | |
| 8,250,485 B2* | 8/2012 | Spisak | G06F 3/0235 |
| | | | 715/825 |
| 10,838,579 B2 | 11/2020 | Blumenkron Hurtado et al. | |
| 11,029,800 B2* | 6/2021 | Narayanan | G06F 3/0482 |
| 2001/0003179 A1 | 6/2001 | Martyn et al. | |
| 2004/0141012 A1 | 7/2004 | Tootill | |
| 2006/0041623 A1 | 2/2006 | Danninger | |
| 2006/0209035 A1* | 9/2006 | Jenkins | G06F 3/0489 |
| | | | 715/831 |
| 2012/0235921 A1* | 9/2012 | Laubach | G06F 3/04892 |
| | | | 345/172 |
| 2012/0254801 A1* | 10/2012 | Gaffney | G06F 8/38 |
| | | | 715/825 |
| 2013/0227482 A1 | 8/2013 | Thorsander et al. | |
| 2014/0082517 A1 | 3/2014 | Vasudev et al. | |
| 2016/0124917 A1* | 5/2016 | Ducat | G06F 8/38 |
| | | | 715/760 |

OTHER PUBLICATIONS

Lou, Mary. Slide and Push Menus. Blog entry posted on Apr. 17, 2013 at tympanus.net. Retrieved from [https://tympanus.net/ codrops/ 2013/04/17 /slide-and-push-menus/] on [Dec. 3, 2020]. 11 pages + screenshots of demonstration (Year: 2013)—Previously cited in a 892 Form dated Dec. 8, 2020 which was issued in U.S. Appl. No. 16/884,471.
892 Form dated Dec. 8, 2020 which was issued in U.S. Appl. No. 16/884,471.
Notice of Allowance dated Jun. 3, 2021 which was issued in U.S. Appl. No. 16/884,471.

* cited by examiner

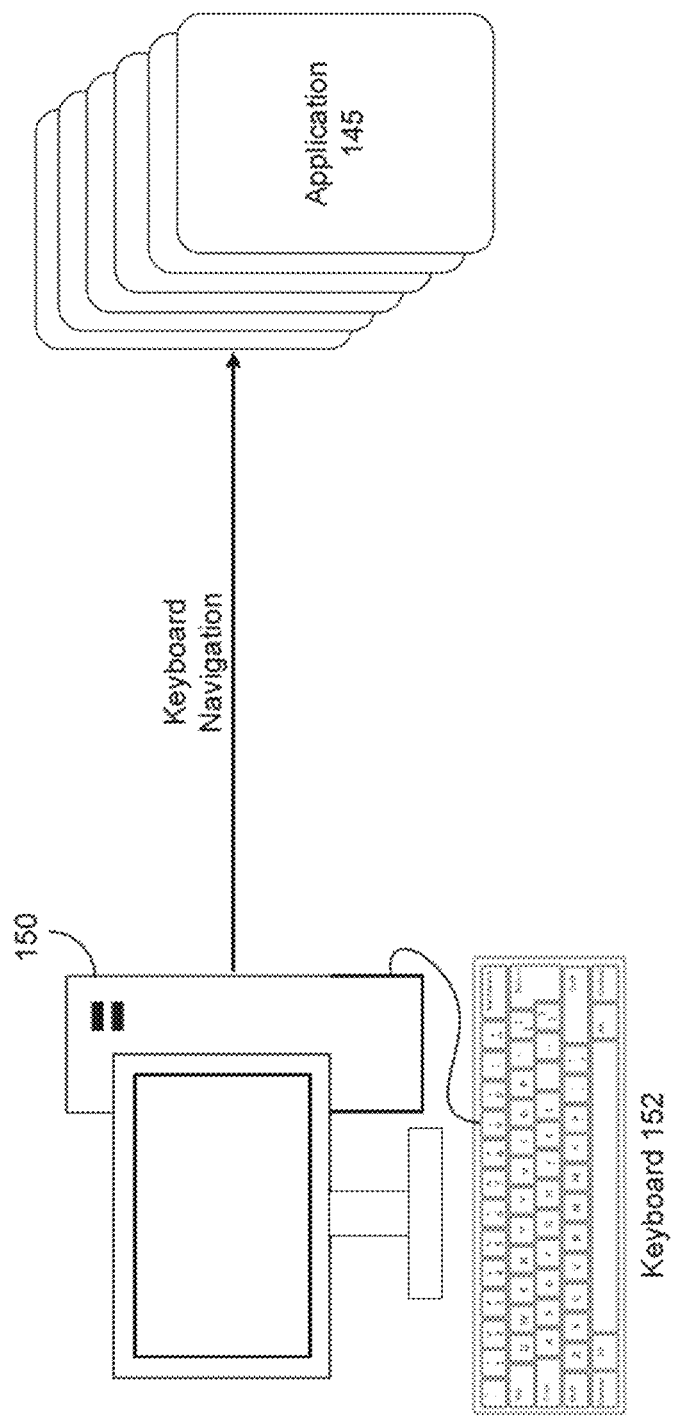

KEYBOARD NAVIGATION MENU

CROSS-REFERENCE TO RELATED APPLICATION(S)

This application is a continuation of U.S. patent application Ser. No. 16/884,471, which was filed on May 27, 2020, in the United States Patent and Trademark Office, the entire disclosure of which is incorporated herein by reference for all purposes.

BACKGROUND

A navigation menu (also referred to herein as a navigation bar, navigation panel, navigation tab, etc.) is typically embedded within a content frame of an application and contains navigable items to different functions of the application. A common implementation of the navigation menu is in the form of a horizontal list of links/tabs at the top of a page. The links may be positioned below a header of the application and outside of a main content area of the page. A user may interact with the navigation menu using a cursor that is controlled by a pointing instrument such as a mouse, a finger, a stylus, or the like.

Larger applications can include many functions which requires many tabs within the navigation menu. In addition, user devices such as tablets, smart phones, smart wearables, and the like, have limited display sizes. Often, the list of navigation tabs is not able to fit on the screen at the same time. In this situation, some of the navigation tabs must be hidden from view. Furthermore, finding the tabs (including hidden tabs) within the navigation menu can require additional inputs such as scrolling, opening a drop-down menu, or the like.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1B is a diagram illustrating a process in which navigation within an application is controlled via a keyboard in accordance with an example embodiment.

Figure 1A:
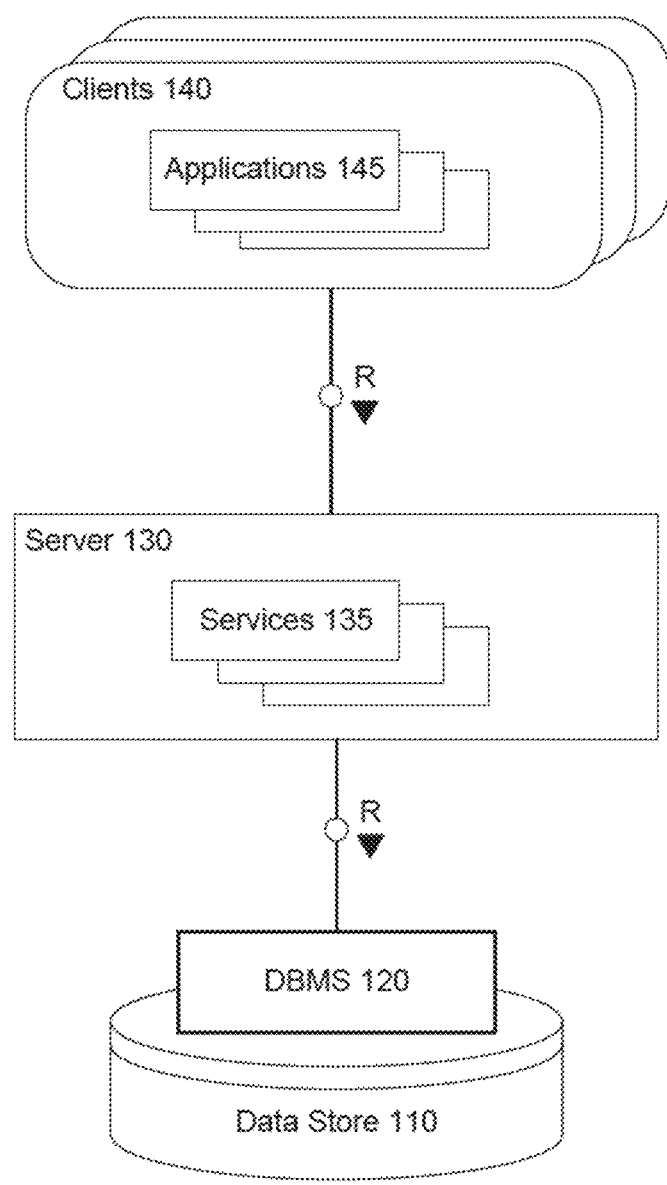
FIG. 1A is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Software applications including native applications, web applications, mobile applications, and the like, can require an extensive number of functions. Functions often include their own pages or views within an application. As a non-limiting example, functions of an accounting application may include ordering, billing, account management, and the like. Each function may have its own page or view within the application where content associated with the function is accessible.

Often, an application is designed with one or more menus (bar, panel, tab, etc.) for opening different content and navigating to different functions. The menu may be embedded or otherwise integrated within the content template of the application. The menu may provide the user with tabs or other items that can be selected by a mouse and cursor to open/navigate to different pages/content of the application. However, the embedded menu may not be able to display all available menu items (selectable tabs) at the same time due to size requirements of the window. This problem is further frustrated due to the reduced screen size of many mobile computing devices which limits the amount of template space for the menu and the actions displayed therein.

The example embodiments are directed to a keyboard navigation menu which overcomes the drawbacks of traditional mouse-based menus through the use of keyboard controls that do not require visibility or mouse/cursor manipulation. Instead, the keyboard controls can be simple keyboard inputs (e.g., numbers, characters, etc.) that, when received, navigate between the functions and/or pages of an application. The keyboard navigation menu may replace the traditional mouse-based navigation menu. For example, a user may activate the keyboard navigation menu causing the mouse-based navigation menu to be disabled, hidden, and/or the like. As another example, the keyboard navigation menu can be a standalone menu that does away with traditional mouse-based navigation menus.

Each function (or page) within the application may have its own dedicated keyboard input (e.g., one or more keys) that when pressed causes a window (or view of a user interface) to navigate to the corresponding function within the application. The keyboard navigation menu may include a display of an identifier of each function and an identifier of the corresponding keyboard input for navigating to the respective function. In some cases, the keyboard navigation menu can remain visible or partially visible to enable the user to learn which keyboard inputs correspond to which functions of the application. As another option, the keyboard navigation menu may be hidden from view. Thus, the viewing area of the application content may be increased.

In some embodiments, the keyboard navigation menu may be configurable thereby allowing a user to customize the format (e.g., color, size, etc.) of the keyboard navigation menu. In addition, the user may modify/rearrange an order in which the functions appear in the keyboard navigation menu. In addition, the user may modify which keyboard inputs are associated with which activities. For example, the user may enter a command to switch keyboard inputs assigned to two different functions in the keyboard navigation menu. The keyboard navigation menu may include selectable boxes, links, etc., which allow the user to easily navigate between a keyboard mode in which the keyboard navigation menu is fully displayed or not displayed at all and a learning mode in which the keyboard navigation menu is partially displayed allowing the function-key press assignments to be partially visible.

The keyboard navigation menu may be activated with a button, a panel, a link, a tab, or other selectable identifier that can be selected using a command entered via a mouse, keyboard, or other input means. In response to activation, the keyboard navigation may expand and in a horizontal direction on the screen. For example, the keyboard navigation menu may expand in a lateral direction on the screen thereby revealing a view of the keyboard inputs and the corresponding menu functions with which they are associated. In some cases, the keyboard navigation menu may automatically collapse in an opposite horizontal direction after expanding or the user may trigger the collapse through an additional button/link. Once the keyboard navigation menu has been activated, the selectable identifier may change colors or include an additional marker to indicate that the keyboard navigation is in an active mode. At the same time, the mouse-based navigation menu may be disabled and even hidden from view thereby increasing the screen space of the application content.

FIG. 1A illustrates a system architecture of a database 100A in accordance with an example embodiment. It should be appreciated that the embodiments are not limited to architecture shown in FIG. 1A or to a database architecture, however, FIG. 1A is shown for purposes of example. The application including the keyboard navigation menu described herein may access data from the database 100A. For example, the database 100A may include or interact with applications which provide user interfaces to visualize underlying data, or the like.

Referring to FIG. 1A, the database 100A includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute one or more of the applications 145 to perform visual analysis via a user interface displayed on the client 140 to view analytical information such as charts, graphs, tables, and the like, based on the underlying data stored in the data store 110. The applications 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the applications 145 may create a report/visualization based on the result set. In this example, DBMS 120 may perform a query optimization on the SQL query to determine a most optimal alternative query execution plan.

Raw data from various sources may be stored in the data store 110. In this example, the applications 145 and/or the services 135 may extract core features from the raw data and also derive features from the core features. The features may be stored as database tables within the data store 110. For example, a feature may be assigned to its own table with one or more columns of data. In one example, the features may be observed as numerical values.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database 100A, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

Data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database. The GUID is used to uniquely identify that data item from among all other data items stored within the database 100.

The database 100A may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of the applications 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

According to various embodiments, one or more of the applications 145 may include a keyboard navigation menu that enables keyboard controls of the navigation through the application. FIG. 1B illustrates an example of a process 150B of a user device 150 interacting with an application 145 comprising a plurality of activities/pages. The user device 150 may include or otherwise be connected to a keyboard 152 such as a physical keyboard, a virtual keyboard, or the like. Here, the application 145 is implemented with the keyboard navigation menu according to various embodiments.

Key presses input on the keyboard 152 may control navigation within a view of the application 145 based on designated or otherwise assigned keyboard inputs within the keyboard navigation menu. For example, different keyboard inputs may be assigned to different pages of the application 145. When a key press is detected on the keyboard 152, the key press may be compared to keyboard inputs within the keyboard navigation menu. If the keypress corresponds to a page within the application 145, a user interface displaying the application 145 may navigate to the selected page. Examples of the keyboard navigation menu are further shown and described with respect to FIGS. 3A-3F.

Figure 2:
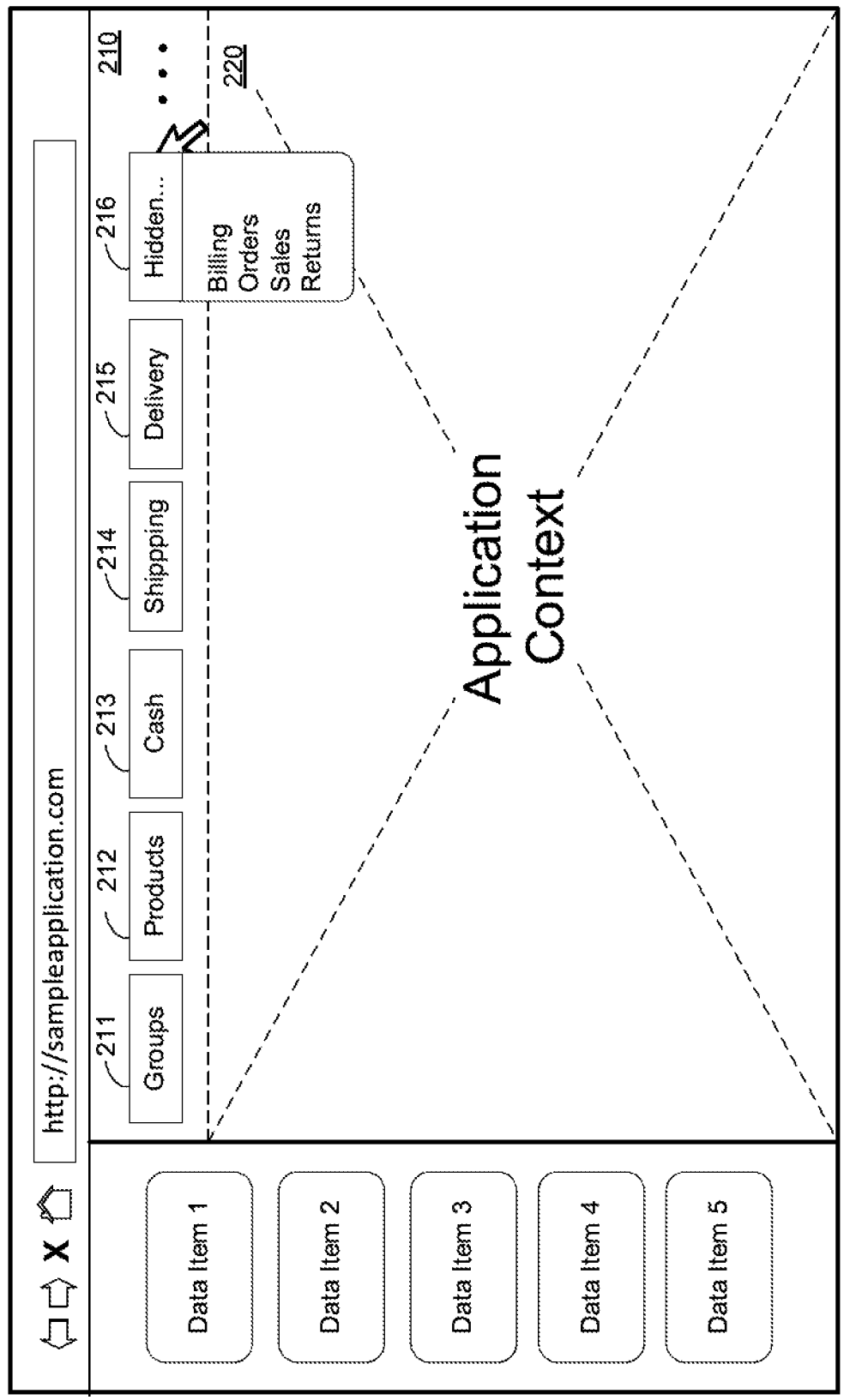
FIG. 2 is a diagram illustrating a mouse-controlled navigation menu in accordance with example embodiments.

FIG. 2 illustrates a mouse-controlled navigation menu 210 in accordance with example embodiments. Referring to FIG. 2, a user interface 200 includes a display of a software application which includes a plurality of functions represented by tabs 211-216 within the navigation menu 210. In this example, there is not enough room on the screen for all of the tabs to be displayed. For example, the functions Billing, Orders, Sales, Returns, etc. are additional functions which have tabs that cannot be displayed within the confined space of the navigation menu 210.

In order to navigation to a function such as Groups, Products, Cash, Shipping, or Delivery, a user may click on a corresponding tab 211, 212, 213, 214, or 215, respectively. In order to make this selection, the user may control a cursor with a mouse or some other pointer such as a finger or stylus on a touch screen. When the user clicks on a tab from among the tabs 211-215, the corresponding page of the function will appear in a context area 220 of the user interface 200. Meanwhile, for remaining tabs that are not present in the navigation menu, the user may select a tab 216 which opens a drop-down menu. This allows the user to select one of the hidden tabs through a second mouse click.

However, the drawbacks of the navigation menu 210 include lack of space which results in some tabs being hidden, user commands that must manipulate a cursor or other pointer, and multiple commands that must be performed to open and select hidden tabs.

According to various embodiments, provided is a keyboard navigation menu that may be used in addition to an existing navigation men 210 or as standalone navigation concept without the navigation menu 210. Some of the benefits of keyboard navigation menu include fast navigation with keyboard support (shortcuts), increased screen availability for other application/page content, availability of all menu items through a single command, and the like. In other words, no menu items require multiple inputs (even when they are hidden). Furthermore, as explained below with respect to FIG. 3D, the keyboard navigation menu also provides a learning mode which can partially collapse the menu enabling a new user to visually recognize the keyboard inputs associated with the different functions of the application.

In some embodiments, the keyboard navigation menu may include a mouse mode (such as shown in FIG. 2) where the keyboard activation menu is not supported. The keyboard activation menu may also include a keyboard mode in which the keyboard commands are active/available for navigating to the different pages of the application. In the keyboard mode, the keyboard navigation menu may disappear from view leaving extra space within the application content. The keyboard activation menu may also include a learning mode in which the keyboard navigation menu partially closes. However, some of the content within the keyboard navigation menu remains visible including an identifier of the keyboard input associated with each function, and a portion of the function's name thereby allowing the user to quickly ascertain the correct keyboard input for navigating to a particular function.

Figure 3A:
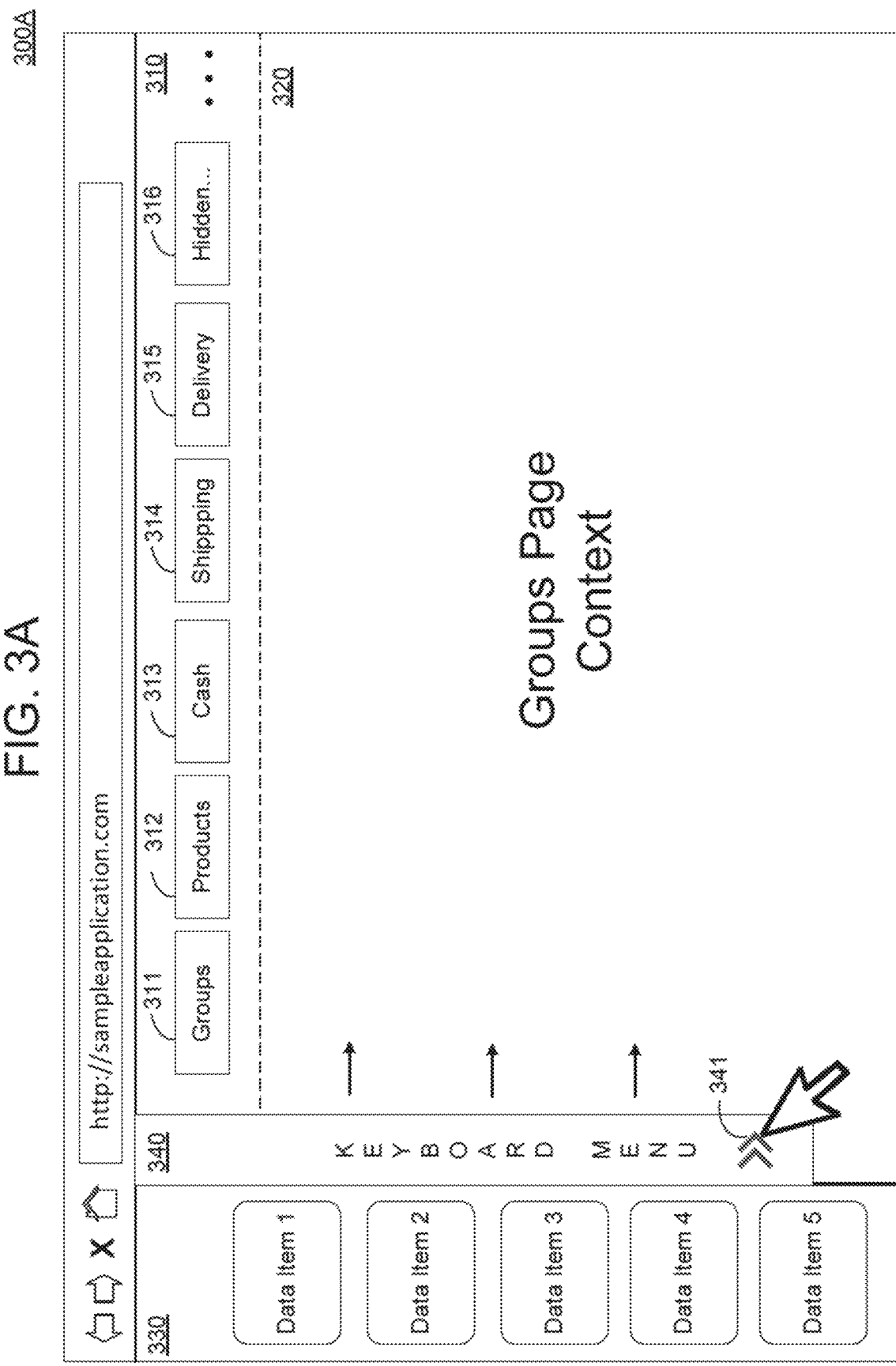
FIGS. 3A-3F are diagrams illustrating interaction with a keyboard navigation menu in accordance with example embodiments.

FIG. 3A illustrates a display of a user interface 300A displaying an application in mouse mode. Here, a mouse-based navigation menu 310 is active and includes menu items 311, 312, 313, 314, 315, and 316, while a keyboard navigation menu 340 is inactive. However, an identifier of the keyboard activation menu 340 is visible as a vertical bar on the left-hand side of the user interface. The user interface 300A further includes a content area 320 with application content displayed therein, and a side window 330 with additional data content. In this example, the identifier of the keyboard activation menu 340 is sandwiched between the window 330 and the content area 320 of the user interface 300A.

In mouse mode, the keyboard activation menu 340 looks and works like many other navigation menus that are capable of being manipulated by a mouse/cursor. For example, the user may move use the cursor and mouse to select an expansion button 341 which causes the keyboard activation menu 340 to expand. In this example, the keyboard navigation menu 340 slides open in a horizontal direction that is outward from the keyboard navigation menu tab.

Figure 3B:
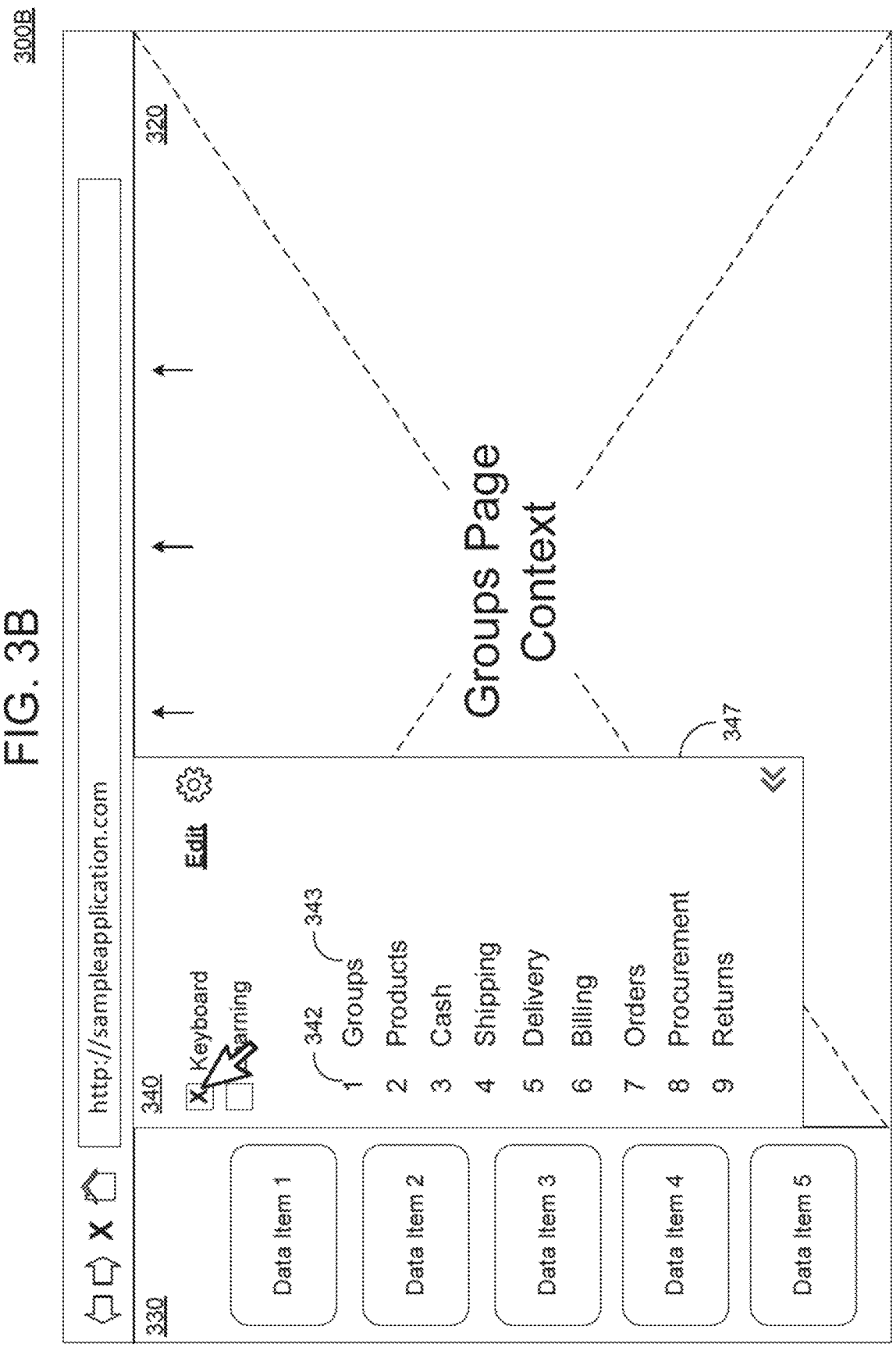

FIG. 3B illustrates a user interface 300B which depicts the keyboard activation menu 340 after it has been expanded by pressing the expand button 341 in FIG. 3A. In this example, a boundary 347 of the keyboard navigation menu is a same size as the initial collapsed tab of the keyboard activation menu 340 shown in FIG. 3A. However, now the content inside the keyboard activation menu 340 is fully visible. The keyboard activation menu 340 includes identifiers 342 of different keyboard inputs and identifiers 343 of different functions of the application that are associated with the keyboard inputs. The identifiers 342 of the keyboard inputs may be displayed separate and independent from the identifiers 343 of the different functions, but adjacent with the identifiers 343 or parallel to the identifiers 343 enabling a user to easily understand which keyboard commands correspond to which functions of the application. Once expanded, the keyboard activation menu 340 may operate like a typical mouse-based menu where a user can continue to use the cursor to select the identifiers 342 and 343 to cause the application to navigate to the particular function. Also, in some embodiments, opening the keyboard activation menu 340 may cause the mouse-based navigation menu 310 to disappear and/or become disabled. In other embodiments, the mouse-based navigation menu may be completely left out of the user interface 300B.

In the example of FIG. 3B, the user moves the cursor to a "keyboard" checkbox shown in the top left corner of the keyboard navigation menu 340. By checking this box, the keyboard mode of the keyboard navigation menu is activated. Thus, the user may now enter commands (also referred to as shortcuts) via a keyboard to control navigation among the pages of the functions of the application. For example, if the user presses the shortcut key '4' or the key combination 'Alt+4', the content area 320 of the user interface 300B may navigate to the Shipping page of the application. If the functions cannot fit within the keyboard activation menu 340, a down arrow (not shown) may be displayed which allows the user to scroll down and visualize any hidden function/key press combinations. In addition, the keyboard activation menu 340 may include a collapse arrow that, when selected, causes the extended keyboard activation menu 340 to collapse back to its original position.

Figure 3C:
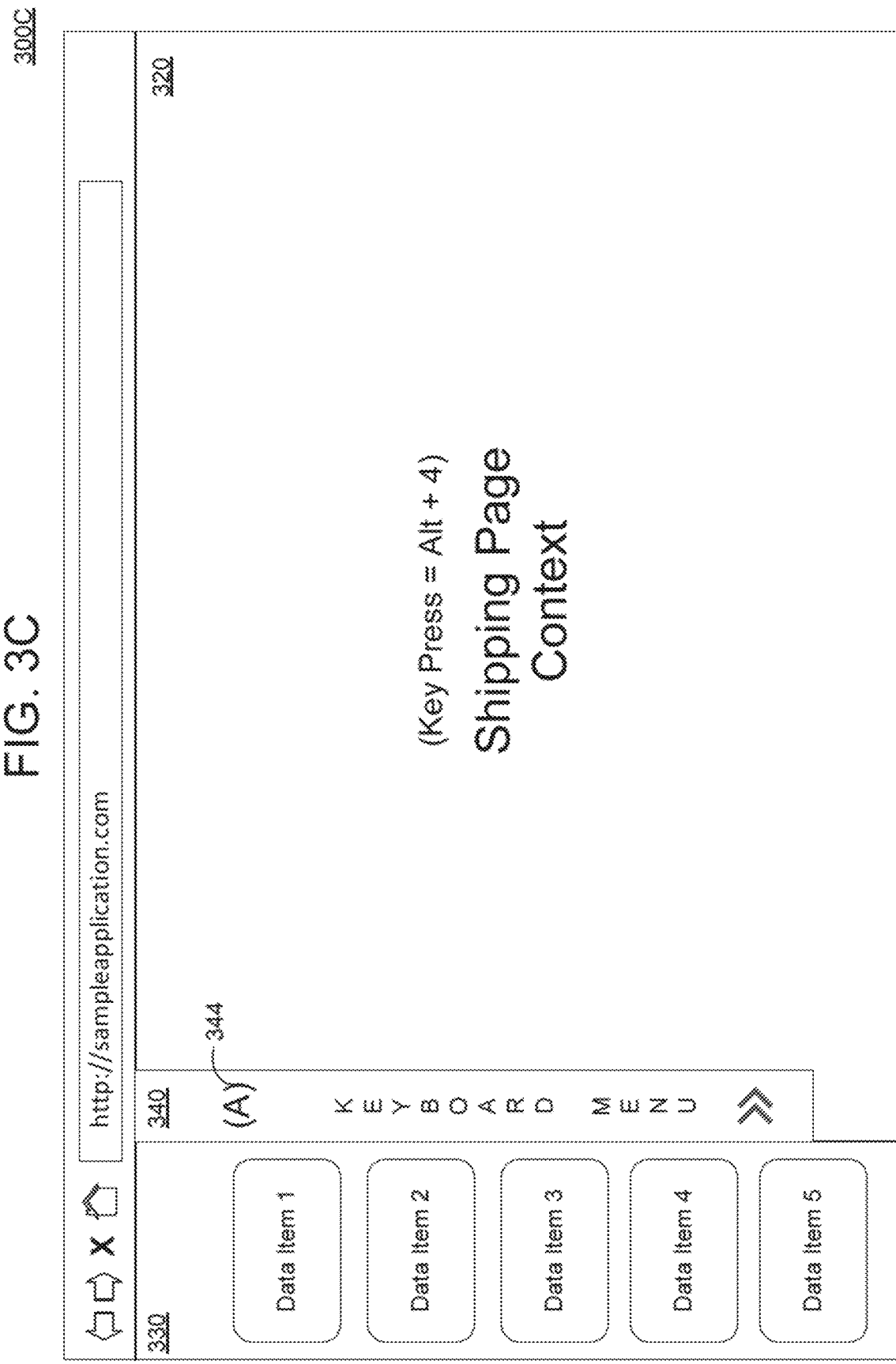

Once the keyboard mode is activated, the keyboard activation menu 340 may collapse to its initial state as shown in FIG. 3C where the identifiers 342 and 343 are hidden from view and the only element that is visible is the identifier of the keyboard navigation menu 340. However, in some embodiments, an activation indicator 344 as shown in FIG. 3C may be added within the identifier of the collapsed keyboard activation menu 340, to represent that the keyboard mode is now active. In this example, the user presses the keyboard input 'Alt+4' while the keyboard mode is on. As a result, the content area 320 of the user interface 300C display the content of the shipping page corresponding to the keyboard input 'Alt+4'. Thus, even though the content of the keyboard activation menu 340 is hidden from view, the user can navigate to different pages of the application using commands within the keyboard activation menu 340. In some embodiments, the keyboard inputs may be numbers, however embodiments are not limited thereto. For example, there may be as many numbers as application functions. As another example, characters, symbols, numbers, commands, or a combination thereof may be used.

Figure 3D:
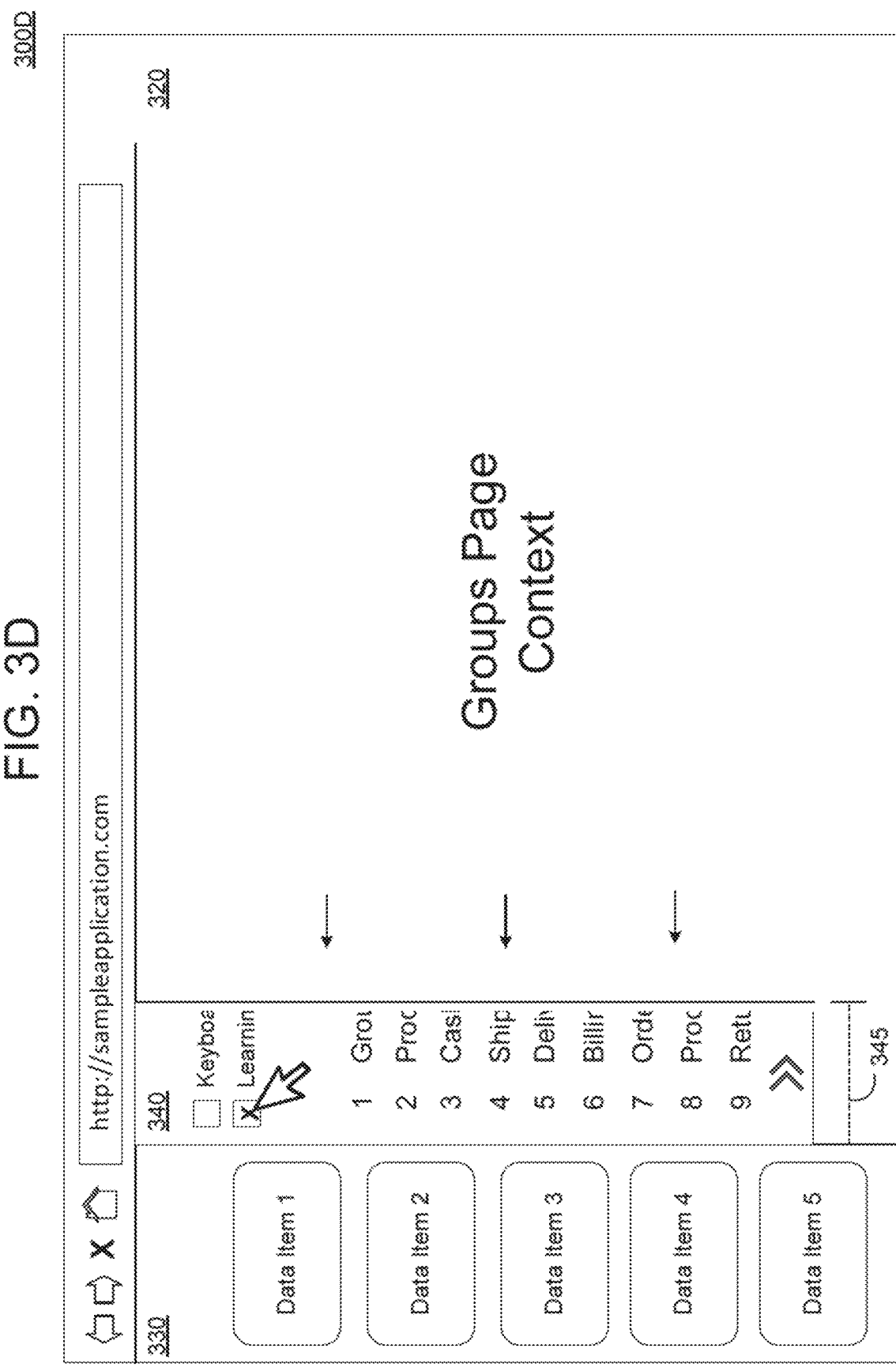

Meanwhile, FIG. 3D illustrates an example of a user interface 300D in which the keyboard navigation menu 340 is shown in learning mode. For example, it may be difficult for a user to remember all possible keyboard inputs and the corresponding application functions. Therefore, the keyboard navigation menu 340 may provide a learning mode. For example, with the keyboard navigation menu 340 open as shown in FIG. 3B, the user may select a "Learning" checkbox as shown in FIG. 3D to get support from the control to learn the keyboard inputs. In response to the learning mode being activated, the keyboard activation menu 340 may collapse partially so that the user can still recognize some information about the shortcuts and the keyboard inputs and the functions associated therewith. Learning mode may work the same as keyboard mode except that the keyboard navigation menu remains partially visible instead of hidden.

In some embodiments, a width 345 of the partial collapse may be modified or otherwise adjusted by the user. For example, the user may specify a number of pixels, characters, screen space, etc., which are displayed in learning mode thereby allowing the user to personalize the learning mode settings, as further described with respect to FIG. 3E. In the example of FIG. 3D, the user has selected to have 4 characters visible which results in a width 345 as shown in the example of FIG. 3D.

Figure 3E:
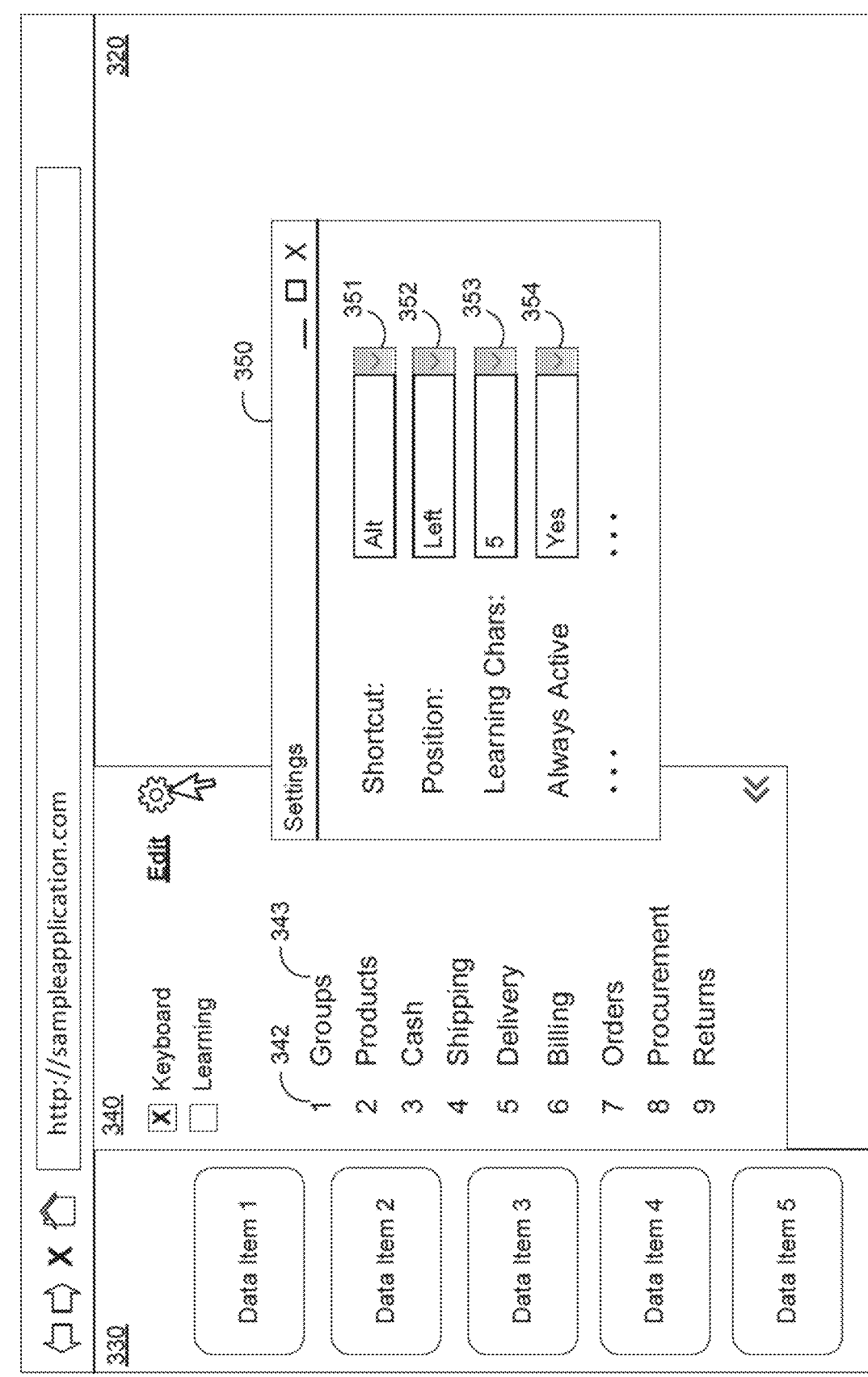

FIG. 3E illustrates a user interface 300E in which a user has selected settings button within the keyboard navigation menu 340. In response to the selection of the edit button, a settings menu 350 may be output in the form of a pop-up menu or the like. The settings menu 350 includes a plurality of fields 351-354 for adjusting features of the keyboard navigation menu 340 including a shortcut field 351 which can be used to assign and adjust a key for the keyboard shortcut "Ctrl", "Alt", "SHIFT", etc., a position field 352 which allows a user to assign and adjust a placement of the keyboard navigation menu on the page, such as left or right side, a learning characters field 353 which allows the user to assign and adjust the number of characters that will be displayed when control is in learning mode, and an always active field 354 which allows the user to assign and adjust whether the keyboard mode is always active even after a browser restart (new session). The settings menu may include other features such as color change options for the keyboard navigation menu 340, and the like.

Figure 3F:
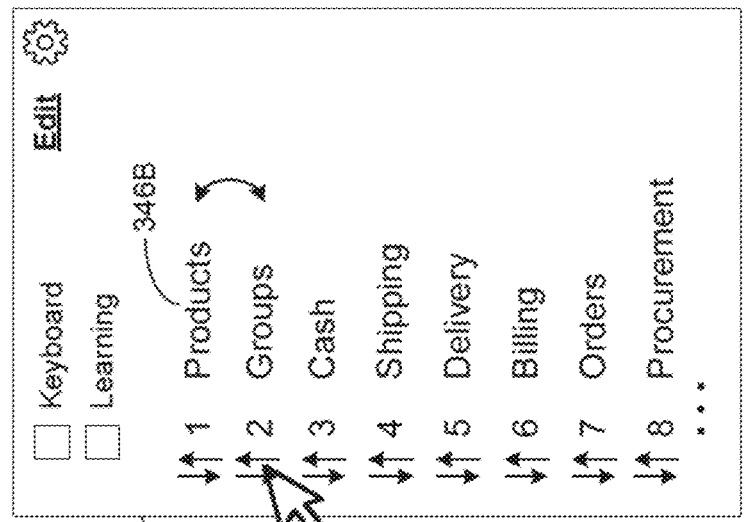
Figure 3F:
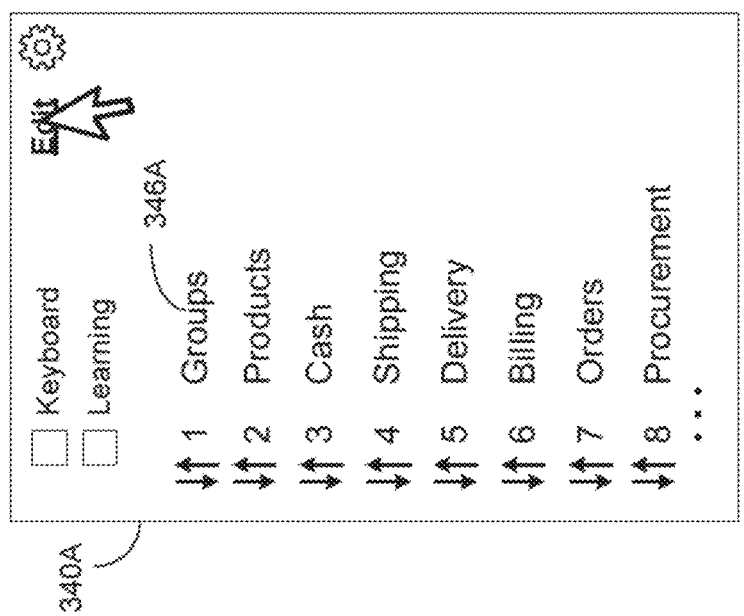

FIG. 3F illustrates a user interface 300F which depicts the keyboard navigation menu before (340A) and after (340B) a rearrangement of functions within the keyboard navigation menu 340. Here, the functions may be ordered in a list. When a user presses the edit button, the keyboard navigation menu 340A may display up and down arrows which can be selected to cause the function to move up and down the list within the keyboard navigation menu. Thus, the user can modify which functions are associated with which keyboard inputs. For example, the user may switch the first and second functions (i.e., Groups and Products) in keyboard navigation menu 340A to create a modified keyboard navigation menu 340B in which the keyboard inputs associated with the first and second functions have switched. In this example, the Groups function is associated with a first keyboard input 346A in the keyboard navigation menu 340A. However, after the rearrangement, the first keyboard input 346B in the keyboard navigation menu 340B is assigned to Products. The rearrangement can be done via drag and drop or as here shown with special icons. The shortcut number (keyboard input) may always remain at the same position in the list while the functions move up and down. That means, that a user can rearrange a function e.g. "Products" with shortcut "2" to a new shortcut "1".

Figure 4:
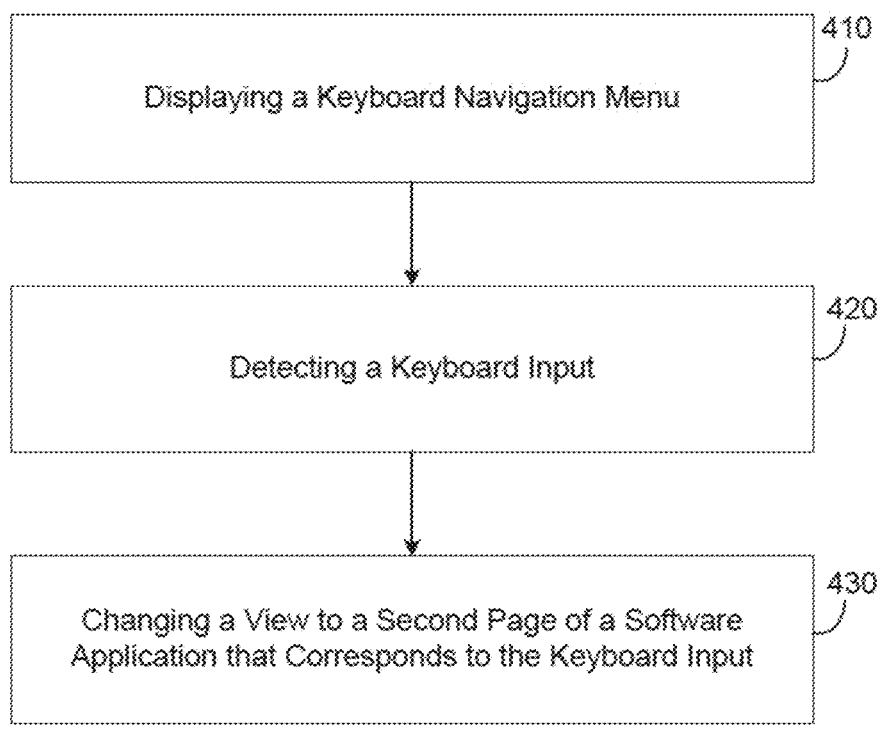
FIG. 4 is a diagram illustrating a method of controlling navigation via a keyboard navigation menu in accordance with an example embodiment.

FIG. 4 illustrates a method 400 of controlling navigation via a keyboard navigation menu in accordance with an example embodiment. For example, the method 400 may be performed by a software program running on a database node, a cloud platform, a server, a computing system (user device), a combination of devices/nodes, or the like. Referring to FIG. 4, in 410 the method may include displaying, via a user interface, a keyboard navigation menu comprising a plurality of different keyboard inputs that when pressed navigate a view of the user interface to a plurality of pages of a software application, respectively. For example, the keyboard navigation menu may be displayed in response to a selection made by the user via the user interface. Here, the user may activate the keyboard navigation menu by selecting a tab or other identifier of the keyboard navigation menu with the user interface.

In some embodiments, the displaying may include sliding a display of the keyboard navigation menu in a horizontal direction in response to an open command. In this example, the keyboard navigation menu may slide in a direction that is perpendicular to a drop-down men. In some embodiments, the menu may overlap and hide a portion of the application content that is underneath.

In some embodiments, the method may further include partially collapsing the display of the keyboard navigation menu in an opposite horizontal direction to partially hide the keyboard navigation menu while leaving the plurality of different keyboard inputs visible, in response to a request for a learning mode. In some embodiments, the method may further include adjusting a horizontal width of the partial collapse of the keyboard navigation based on a change request received via the user interface. For example, a user may specify a number of characters of an activity/page identifier to display, and the keyboard navigation menu may partially collapse to a point where the number of characters are still visible while the remaining characters are not visible.

In 420, the method may include detecting a keyboard input from among the plurality of different keyboard inputs which corresponds to a second page from among the plurality of pages of the software application. For example, the user may enter a key press into a keyboard (physical, virtual, etc.), and the application may compare the numbers, characters, symbols, etc. included in the key press. If they key press matches a key press of a page from among the plurality of pages as specified in the keyboard navigation menu, the application may navigate to a view of the corresponding page. For example, in 430, the method may include changing a view of the user interface from the first page to the second page of the software application that corresponds to the detected keyboard input.

In some embodiments, the method may further include displaying a tab-based navigation menu comprising a plurality of tabs that when selected via a mouse are configured to navigate to the plurality of pages of the software application, respectively. In some embodiments, the displaying the keyboard navigation menu may include hiding the displayed tab-based navigation menu and opening the keyboard navigation menu within the view of the user interface. In some embodiments, the displaying the keyboard navigation menu may include displaying labels of the plurality of pages next to labels of the plurality of different keyboard inputs, respectively, within the keyboard navigation menu. In some embodiments, the method may further include modifying a keyboard input that is assigned to a page of the software application based on a request via the user interface.

Figure 5:
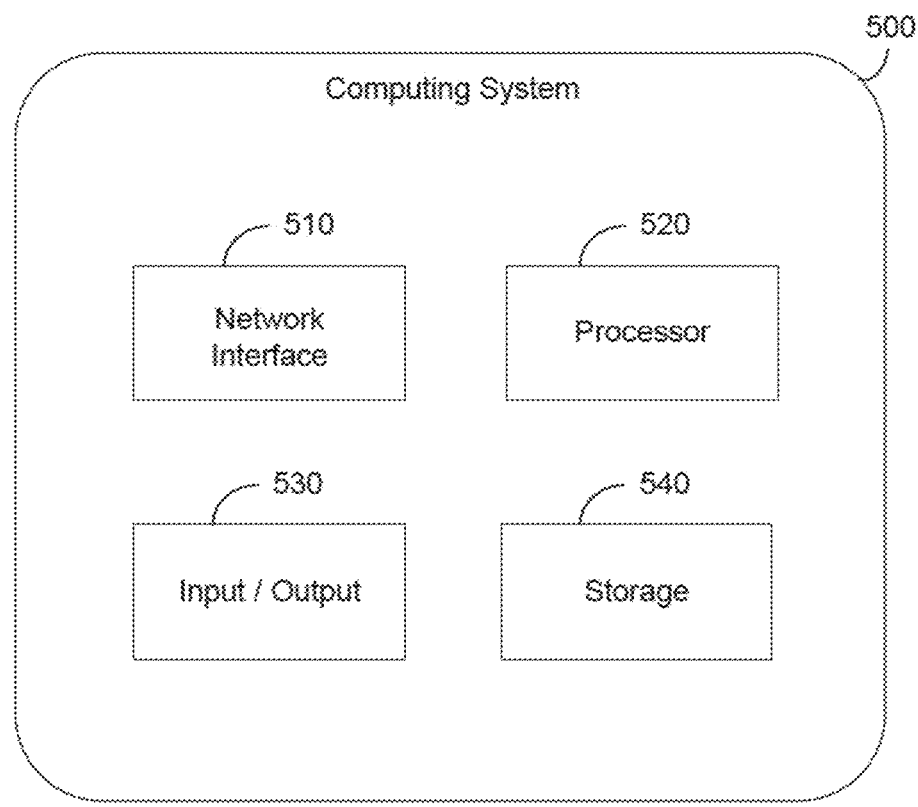
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes.

Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a microphone, a display, an input unit(s), a receiver, a transmitter, a persistent disk, and the like. The processor 520 may control or replace any of the other components of the computing system 500.

The network interface 510 may transmit and receive data over a network such as the Internet, a private network, a public network, an enterprise network, and the like. The network interface 510 may be a wireless radio interface, a wired interface such as a network card, a satellite communication interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other non-transitory instructions which can be executed by the processor 520 to perform the methods and processes described herein. The storage 540 may include a data store having a plurality of tables, partitions and sub-partitions. The storage 540 may be used to store database records, items, entries, and the like. Also, the storage 540 may be queried using SQL commands.

According to various embodiments, the processor 520 may display, via a user interface, a keyboard navigation menu comprising a plurality of different keyboard inputs that when pressed navigate a view of the user interface to a plurality of pages of a software application, respectively.

The processor 520 may detect a keyboard input from among the plurality of different keyboard inputs which corresponds to a second page from among the plurality of pages of the software application. The processor 520 may change a view of the user interface from the first page to the second page of the software application that corresponds to the detected keyboard input.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a processor configured to:
        display, via a user interface of a software application, an embedded menu bar that comprises a plurality of menu options which when clicked on by a pointer mechanism navigate a view of the user interface to a plurality of pages of the software application, respectively,
        detect an activation input via a keyboard navigation menu identifier on the user interface of the software application, and
        in response to the detection, remove the embedded menu bar from the user interface and display, via the user interface, a keyboard navigation menu at a location of the keyboard navigation menu identifier, wherein the keyboard navigation menu comprises a plurality of identifiers of the plurality of menu options from the embedded menu bar mapped to a plurality of keyboard commands, respectively, inside a content area of the keyboard navigation menu.

2. The computing system of claim 1, wherein the embedded menu bar comprises a set of menu options, and the processor is further configured to display the keyboard navigation menu with identifiers of a different set of menu options.

3. The computing system of claim 1, wherein the processor is further configured to remove the embedded menu bar by scrolling the embedded menu bar toward an edge of the user interface until the embedded menu bar is hidden from the user interface.

4. The computing system of claim 1, wherein the processor is configured to display the plurality of identifiers of the plurality of menu options arranged horizontally with respect to each other in the keyboard navigation menu.

5. The computing system of claim 1, wherein the keyboard navigation menu identifier comprises a vertical bar, and the processor is configured to slide the keyboard navigation menu horizontally within the user interface from an edge of the keyboard navigation menu identifier on which the activation input is received.

6. The computing system of claim 5, wherein the processor is configured to partially collapse the keyboard navigation menu in an opposite horizontal direction to partially hide the identifiers of the plurality of different keyboard commands, in response to a request for a learning mode.

7. The computing system of claim 1, wherein the processor is configured to display the keyboard navigation menu over a portion of the view within the user interface.

8. A method comprising:
    displaying, via a user interface of a software application, an embedded menu bar comprising a plurality of menu options which when selected by a pointer mechanism navigate a view of the user interface to a plurality of pages of the software application, respectively;
    detecting an activation input via a keyboard navigation menu identifier of a keyboard navigation menu on the user interface of the software application; and
    in response to the detecting, removing the embedded menu bar from the user interface and displaying, via the user interface, the keyboard navigation menu at a location of the keyboard navigation menu identifier, wherein the keyboard navigation menu comprises a plurality of identifiers of the plurality of menu options from the embedded menu bar mapped to a plurality of keyboard commands, respectively, inside a content area of the keyboard navigation menu.

9. The method of claim 8, wherein the embedded menu bar comprises a set of menu options, and the displaying the keyboard navigation menu comprises displaying the keyboard navigation menu with identifiers of a different set of menu options.

10. The method of claim 8, wherein the removing comprises removing the embedded menu bar by scrolling the embedded menu bar toward an edge of the user interface until the embedded menu bar is hidden from the user interface.

11. The method of claim 8, wherein the displaying comprises displaying the plurality of identifiers of the plurality of menu options arranged horizontally with respect to each other in the keyboard navigation menu.

12. The method of claim 8, wherein the keyboard navigation menu identifier comprises a vertical bar, and the instantiating comprises sliding the keyboard navigation menu horizontally within the user interface from an edge of the keyboard navigation menu identifier on which the activation input is received.

13. The method of claim 12, wherein the method further comprises partially collapsing the keyboard navigation menu in an opposite horizontal direction to partially hide the identifiers of the plurality of different keyboard commands, in response to a request for a learning mode.

14. The method of claim 8, wherein the instantiating comprises displaying the keyboard navigation menu over a portion of the view within the user interface.

15. A non-transitory computer-readable medium comprising instructions that when executed by a processor cause a computer to perform a method comprising:
    displaying, via a user interface of a software application, an embedded menu bar comprising a plurality of menu options which when clicked on by a pointer mechanism navigate a view of the user interface to a plurality of pages of the software application, respectively;
    detecting an activation input via a keyboard navigation menu identifier of a keyboard navigation menu on the user interface of the software application; and
    in response to the detecting, removing the embedded menu bar from the user interface and displaying, via the user interface, the keyboard navigation menu at a location of the keyboard navigation menu identifier, wherein the keyboard navigation menu comprises a plurality of identifiers of a plurality of different keyboard commands mapped to the plurality of menu options from the embedded menu bar, respectively, inside a content area of the keyboard navigation menu.

16. The non-transitory computer-readable medium of claim 15, wherein the embedded menu bar comprises a set of menu options, and the displaying the keyboard navigation menu comprises displaying the keyboard navigation menu with identifiers of a different set of menu options.

17. The non-transitory computer-readable medium of claim 15, wherein the removing comprises removing the embedded menu bar by scrolling the embedded menu bar toward an edge of the user interface until the embedded menu bar is hidden from the user interface.

* * * * *